United States Patent [19]
Ohie

[11] Patent Number: 5,581,556
[45] Date of Patent: Dec. 3, 1996

[54] LOCAL AREA NETWORK SYSTEM

[75] Inventor: Mitsuya Ohie, Tokyo, Japan

[73] Assignee: Oki Electric Industry Co., Ltd., Tokyo, Japan

[21] Appl. No.: 226,695

[22] Filed: Apr. 12, 1994

[30] Foreign Application Priority Data

Apr. 16, 1993 [JP] Japan ................................. 5-089631

[51] Int. Cl.$^6$ .............................. H04J 3/14; H04L 12/40
[52] U.S. Cl. ...................... 370/431; 375/220; 375/318; 375/340
[58] Field of Search ................................ 370/85.1, 85.2, 370/85.3, 85.9, 85.11, 110.1, 119, 94.1; 375/316, 220, 317, 318, 320, 340, 259, 295, 286, 287, 310, 219, 282; 340/825.06, 825.07, 825.08, 825.1, 825.17, 825.52, 825.53, 825.54, 825.57; 455/38.1, 38.2, 38.3, 343; 371/16.3, 62; 395/750; 364/948.6, 273.1, 273.2, 273.5; 345/211, 212

[56] References Cited

U.S. PATENT DOCUMENTS

| | | | |
|---|---|---|---|
| 3,659,286 | 4/1972 | Perkins et al. | 375/282 |
| 5,241,542 | 8/1993 | Natarajan et al. | 370/95.3 |
| 5,347,538 | 9/1994 | Marbot . | |
| 5,351,041 | 9/1994 | Ikata et al. . | |
| 5,412,688 | 5/1995 | Marbot | 375/259 |

FOREIGN PATENT DOCUMENTS

| | | |
|---|---|---|
| 482957 | 4/1992 | European Pat. Off. . |
| 504060 | 9/1992 | European Pat. Off. . |
| 515042 | 11/1992 | European Pat. Off. . |
| 4037578 | 9/1991 | Germany . |

*Primary Examiner*—Wellington Chin
*Assistant Examiner*—Huy D. Vu

[57] ABSTRACT

A local area network line system having a bus line and a plurality of devices is disclosed. Each of the devices comprises a data receiver circuit coupled to the bus line for detecting a communication start request from a signal applied on the bus line and being in a sleep mode when the data receiver circuit receives a sleep command signal and a transmitting circuit coupled to the bus line for outputting a transmitting signal in response to a transmit control signal. Each of the devices further comprises an edge detection circuit coupled to the bus line for detecting a level variation of the signal applied on the bus line and outputting a detection signal in response to the detected level variation and a communication control circuit coupled to the data receiver circuit, the transmitting circuit and the edge detection circuit for outputting the transmit control signal to the transmitting circuit. The transmitting circuit includes a sleep/wake-up control circuit for outputting the sleep command signal to the data receiver circuit.

27 Claims, 2 Drawing Sheets

LOCAL AREA NETWORK SYSTEM

CROSS REFERENCE TO RELATED APPLICATION

This application claims the priority of Japanese Application Serial No. 89631/1993, filed Apr. 16, 1993, the subject matter of which is incorporated herein by reference.

BACKGROUND OF THE INVENTION

1. Field of the Invention

This invention relates to a local area network (hereinafter called "LAN") line system having a plurality of devices (nodes) spaced away from each other so as to exchange information therebetween, and particularly to a sleep/wake up (hereinafter called a "SLEEP/WAKE-UP") control circuit incorporated into each of nodes which are electrically connected to LAN lines.

2. Description of the Related Art

Each of nodes respectively electrically connected to LAN lines has such a function (hereinafter called a "WAKE-UP function") that each node enters into a mode (hereinafter called a "SLEEP mode") for reducing current to be consumed when each LAN line is not in use and is reset to a communication enable state when it is detected from which node a signal would be output to each of the LAN lines.

Since, however, each node monitors and detects a communication start request to one of nodes even after having been brought to the SLEEP mode, it is necessary to monitor the state of the signal transmitted over each BUS. Accordingly, a power source used for a differential comparator corresponding to a receiving circuit included in each node cannot be turned off. Further, a current of the order of at least several tens of µAmps to several hundreds of µAmps needs to be used up even during the SLEEP mode. Therefore, the more the number of the nodes electrically connected to the BUS lines increases, the more the current consumption of a LAN line system becomes greater, with the result that less power consumption cannot be achieved. When the supply of current to the differential comparator is stopped to realize the less power consumption, a variation in the signal which appears on each of the BUS lines, i.e., the communication start request to one of nodes cannot be monitored and detected.

SUMMARY OF THE INVENTION

It is an object of the present invention to provide a local area network line system having low power consumption. It is another object of the present invention to provide a local area network line system having improved WAKE-UP function.

The above objects are generally achieved according to the present invention by a local area network line system having a bus line and a plurality of devices, each of the devices comprising a data receiver circuit coupled to the bus line for detecting a communication start request from a signal applied on the bus line and being in a sleep mode when the data receiver circuit receives a sleep command signal, a transmitting circuit coupled to the bus line for outputting a transmitting signal in response to a transmit control signal, an edge detection circuit coupled to the bus line for detecting a level variation of the signal applied on the bus line and outputting a detection signal in response to the detected level variation, and a communication control circuit coupled to the data receiver circuit, the transmitting circuit and the edge detection circuit for outputting the transmit control signal to the transmitting circuit. The transmitting circuit includes a sleep/wake-up control circuit for outputting the sleep command signal to the data receiver circuit.

DETAILED DESCRIPTION OF THE PREFERRED EMBODIMENTS

Figure 1:
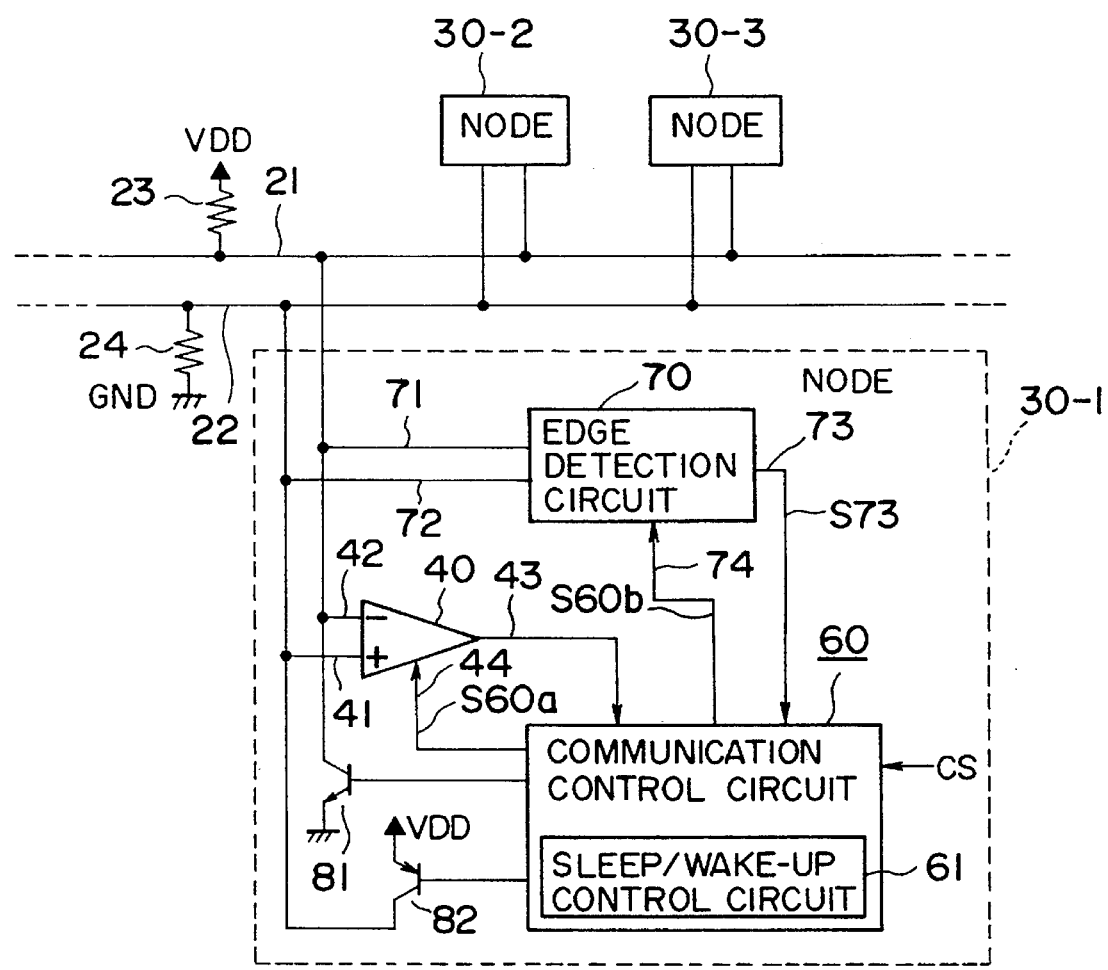
FIG. 1 is a circuit diagram of a LAN line system according to one embodiment of the present invention.

FIG. 1 is a view schematically showing the structure of a LAN line system using two lines or conductors of a twisted pair, which illustrates a preferred embodiment of the present invention.

The LAN line system has a BUS (−) line 21 and a BUS (+) line 22 for multiplex communication. The BUS (−) line 21 is electrically connected to a power source potential VDD through a pull-up resistor 23. The BUS (+) LINE 22 is electrically connected to a ground potential GND through a pull-down resistor 24. In a multiplex communication system, a plurality of devices (nodes) 30-1, 30-2, 30-3, . . . each having a master device function make use of the BUS (−) line 21 and the BUS (+) line 22 in common. In each of the nodes 30-1, 30-2, 30-3, . . . , a receiving circuit, which serves as an input circuit, is identical in circuit configuration to a transmitting circuit which serves as an output circuit.

For example, the node 30-1 comprises a differential comparator 40 with a current cut-off function, which corresponds to a receiving circuit for receiving digital data on the BUS (−) line 21 and the BUS (+) line 22 therein, a transmitting circuit comprised of an NPN transistor 81 and a PNP transistor 82 for outputting the digital data to the BUS (−) line 21 and the BUS (+) line 22 respectively, a communication control circuit 60 having a SLEEP/WAKE-UP control circuit 61, and an edge detection circuit 70 corresponding to a signal variation detecting circuit for detecting a variation in a signal transmitted over each of the BUS (−) line 21 and the BUS (+) line 22 and transferring the result of detection to the communication control circuit 60.

A (+) input terminal 41 of the differential comparator 40 and a (−) input terminal 42 thereof are respectively electrically connected to the BUS (+) line 22 and the BUS (−) line 21. An output terminal 43 of the differential comparator 40 is electrically connected to the communication control circuit 60. The differential comparator 40 has a SLEEP control terminal 44 for receiving a SLEEP command signal S60a from the communication control circuit 60. The differential comparator 40 cuts off its internal current path in response to the SLEEP command signal S60a. The transistors 81 and 82, which constitute the transmitting circuit, are base-controlled based on control signals output from the communication control circuit 60. The collector of the transistor 81 is electrically connected to the BUS (−) line 21, whereas the collector of the transistor 82 is electrically connected to the BUS (+) line 22. The emitter of the transistor 81 is electrically connected to the GND, whereas the emitter of the transistor 82 is electrically connected to the VDD.

Figure 4:
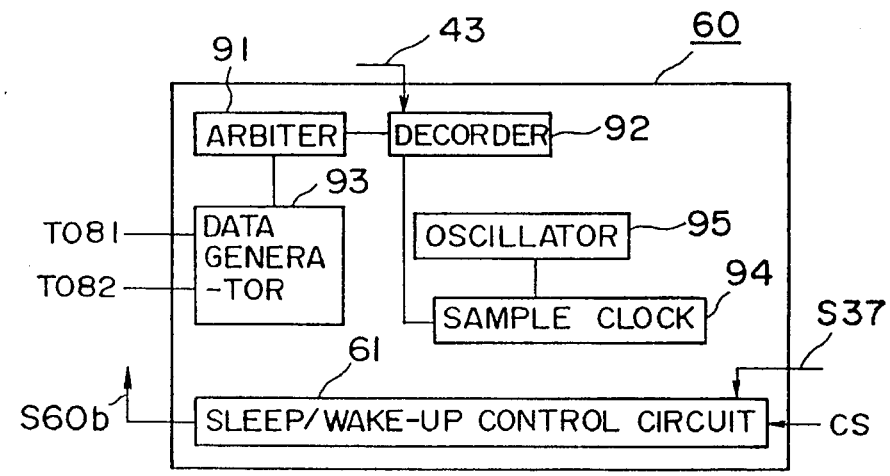
FIG. 4 is a block diagram of a communication control circuit employed in the LAN line system shown in FIG. 1.

As shown in FIG. 4, the communication control circuit 60 has an arbiter 91 for controlling a possessory right to the BUS line, a decoder 92 for decoding the output of the differential comparator 40 and taking in received data, a transmission data generator 93 for generating transmission data therefrom so as to control the bases of the transistors 81 and 82, a sample clock generator 94 for sampling (decoding) the digital data on the BUS (−) line 21 and the BUS (+) line 22 and an oscillator 95 such as a quartz crystal or the like. Further, the communication control circuit 60 has a SLEEP/WAKE-UP control circuit 61. The SLEEP/WAKE-UP control circuit 61 is brought to a SLEEP mode in response to a SLEEP control signal CS sent from a host CPU (Central Processing Unit) or the like. Under the SLEEP mode, the SLEEP/WAKE-UP control circuit 61 outputs the SLEEP command signal S60a to the SLEEP control terminal 44 of the differential comparator 40 to stop the flow of a source current supplied to the differential comparator 40. Further, the SLEEP/WAKE-UP control circuit 61 has a function for supplying an initializing signal S60b to a reset terminal 74 of the edge detection circuit 70 so that the SLEEP/WAKE-UP control circuit 61 enters into a normal operation mode when the SLEEP/WAKE-UP control circuit 61 decodes a WAKE-UP command signal S73 output from an output terminal 73 of the edge detection circuit 70 and confirms a communication start request issued from each of other nodes 30-2, 30-3, . . .

The edge detection circuit 70 has input terminals 71 and 72 respectively electrically connected to the BUS (−) line 21 and the BUS (+) line 22 and detects a variation (e.g., a variation such as "1" to "0", "0" to "1" or the like) in the level of a signal input from each of the input terminals 71 and 72. When the edge detection circuit 70 detects such a variation, the edge detection circuit 70 outputs the WAKE-UP command signal S73 from the output terminal 73 thereof so as to be transmitted to the SLEEP/WAKE-UP control circuit 61 provided within the communication control circuit 60.

Figure 2:
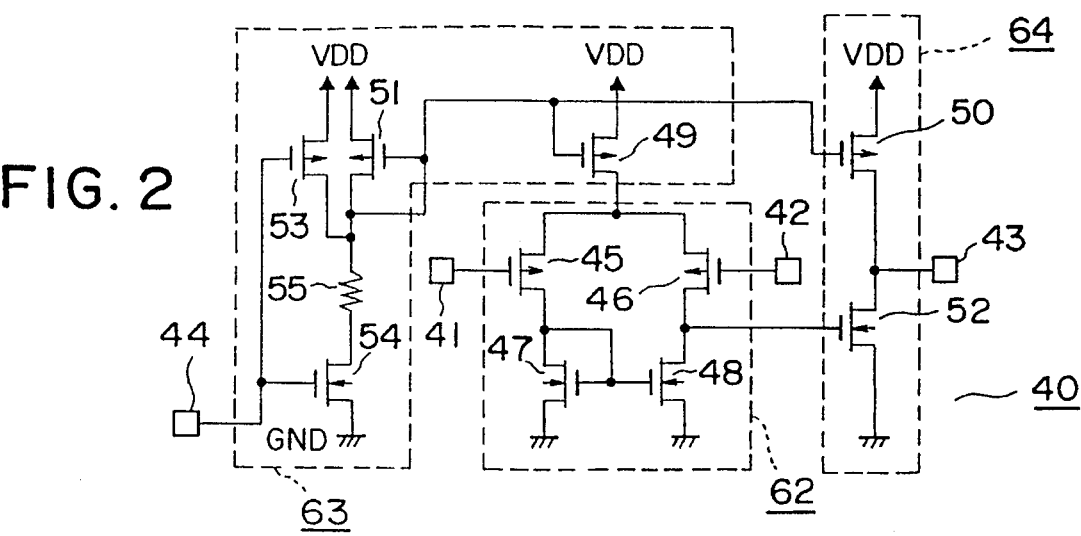
FIG. 2 is a circuit diagram of a differential comparator employed in the LAN line system shown in FIG. 1.

FIG. 2 is a circuit diagram showing one example of the structure of the differential comparator 40 with a SLEEP function, which is shown in FIG. 1.

The differential comparator 40 has a circuit incorporated therein for turning off or cutting off the current path under the SLEEP state regardless of the level of each input supplied thereto to thereby reduce the current to be consumed. This type of consumption current reducing circuit has a differential section 62, a current source section 63 and an output section 64, each of which is constructed of a current mirror circuit. Less current consumption is realized by cutting off the current path of the current source section 63 under the SLEEP state, fixing a voltage applied to the gate of a current-supplying P channel MOS transistor (hereinafter called a "PMOS") 50 to a VDD level and turning off the PMOS 50.

The differential section 62 comprises PMOSs 45 and 46 and N channel MOS transistors (hereinafter called "NMOSs") 47 and 48. The current source section 63 comprises PMOSs 49, 51 and 53, an NMOS 54 and a resistor 55 for deciding the value of current. The output section 64 comprises the PMOS 50 and an output NMOS 52.

The (+) input terminal 41 is electrically connected to the gate of the PMOS 45 and the (−) input terminal 42 is electrically connected to the gate of the PMOS 46. The source of the PMOS 45 and the source of the PMOS 46 are electrically connected in common with the drain of the PMOS 49. The drain of the PMOS 45 is electrically connected to the drain and gate of the NMOS 47. The source of the NMOS 47 is electrically connected to the GND. The drain of the PMOS 46 is electrically connected to the drain of the NMOS 48 and the gate of the NMOS 52. The respective sources of the NMOSs 48 and 52 are electrically connected to the GND.

The drain of the NMOS 52 is electrically coupled to the output terminal 43 and the drain of the PMOS 50. The source of the PMOS 50 is electrically connected to the VDD. The respective gates of the PMOSs 49 and 50 are electrically connected in common with the gate and drain of the PMOS 51. The source of the PMOS 51 is electrically connected to the VDD and the gate and drain thereof are electrically connected in common with one end of the resistor 55. The drain of the PMOS 53 is electrically connected to the one end of the resistor 55 and the source thereof is electrically connected to the VDD. The other end of the resistor 55 is electrically connected to the drain of the NMOS 54 and the source of the NMOS 54 is electrically connected to the GND. The respective gates of the NMOS 54 and the PMOS 53 are electrically common-connected to the SLEEP control terminal 44. When the NMOS 54 and the PMOS 53 are supplied with an "H" input, they can be set to an operating state. On the other hand, when they are supplied with an "L" input, they can be set to the SLEEP state.

Figure 3:
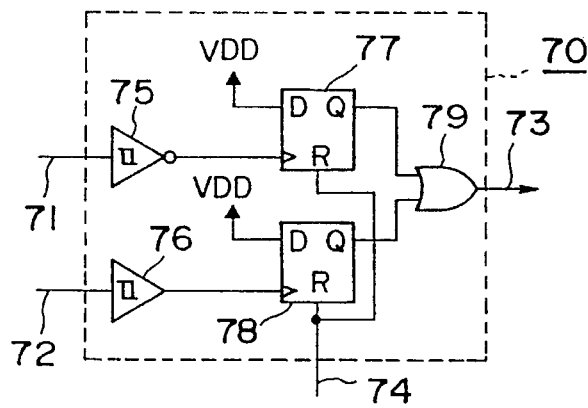
FIG. 3 is a circuit diagram of an edge detection circuit employed in the LAN line system shown in FIG. 1.

FIG. 3 is a circuit diagram illustrating one example of the structure of the edge detection circuit 70 shown in FIG. 1.

The input terminal 71 is electrically connected to an input terminal of a schmitt inverter 75. Further, an output terminal of the schmitt inverter 75 is electrically connected to a clock input terminal of a delay-type flip-flop (hereinafter called a "D-FF") 77. The input terminal 72 is electrically connected to an input terminal of a schmitt buffer 76. An output terminal of the schmitt buffer 76 is electrically connected to a clock input terminal of a D-FF 78. Date input terminals D of the respective D-FFs 77 and 78 are electrically connected to the VDD and respective reset input terminals R of the D-FFs 77 and 78 are electrically common-connected to a reset terminal 74. Data output terminals Q of the D-FFs 77 and 78 are electrically connected to an input terminal of a two input OR gate 79. The result of edge detection is produced from an output terminal of the two input OR gate 79 and is output to the outside from the output terminal 73.

When the falling edge of the signal input to the input terminal 71 is detected by the schmitt inverter 75 of the edge detection circuit 70 or when the rising edge of the signal input to the input terminal 72 is detected by the schmitt buffer 76, "1" is output from the data output terminal Q of the D-FF 77 electrically connected to the output terminal of the schmitt inverter 75 and "1" is output from the data output terminal Q of the D-FF 78 electrically connected to the output terminal of the schmitt buffer 76. These outputs are ORed by the OR gate 79 and hence the result of ORing, i.e., the result of edge detection is output from the output terminal 73 of the OR gate 79. When the initializing signal S60b is input to the reset terminal 74 after completion of the edge detection or upon turning on the power source, the respective D-FFs 77 and 78 are reset to thereby bring the data output terminals Q thereof to "0" so that the edge detection circuit 70 is initialized.

The operation of the LAN line system constructed as described above will now be described below.

Each of the communication control circuits 60 respectively provided within the nodes 30-1, 30-2, 30-3, . . . shown in FIG. 1 controls the bases of the transistors 81 and 82 for outputting the data to their corresponding BUS (−) line 21 and BUS (+)line 22, takes in or receives the data from the output of the differential comparator 40 and effects the SLEEP control of the SLEEP/WAKE-UP control circuit 61. The SLEEP control of the SLEEP/WAKE-UP control circuit 61 is effected as follows. That is, the SLEEP/WAKE-UP control circuit 61 confirms the WAKE-UP command signal S73 output from the output terminal 73 of the edge detection circuit 70 and outputs the initializing signal S60*b* for initializing the edge detection circuit 70 therefrom. Further, the SLEEP/WAKE-UP control circuit 61 outputs the SLEEP command signal S60*a* for stopping the supply of the source current to the differential comparator 40 to the differential comparator 40.

Upon a normal communication operation (normal operation mode), each of the communication control circuits 60 respectively provided within the nodes 30-1, 30-2, 30-3, . . . outputs the initializing signal S60*b* to the edge detection circuit 70 to inactivate the edge detection circuit 70 and activates the differential comparator 40 without using the output of the edge detection circuit 70 to monitor whether or not the communication start requests are input from other nodes.

When the communication start request is sent from the node 30-2 to the node 30-1, for example, the differential comparator 40 in the node 30-1 detects the signals transmitted over the BUS (−) line 21 and the BUS (+) line 22 and supplies the detected signals to the communication control circuit 60. The communication control circuit 60 makes a decision as to whether or not the communication start request has been directed or destined to the communication control circuit 60. If the answer is YES, then the differential comparator 40 detects messages subsequently transmitted over the BUS (−) line 21 and the BUS (+) line 22 and the decoder 92 of the communication control circuit 60 decodes the output sent from the differential comparator 40. When the communication control circuit 60 of the node 30-1 responds to the node 30-2, the transmission data generator 93 provided inside the communication control circuit 60 generates transmission data therefrom and effects the base control on the transistors 81 and 82 so as to send the transmission data to the corresponding BUS (−) line 21 and BUS line (+) line 22. The transmission data is read by the communication control circuit 60 of the node 30-2. While the communication is being performed between the nodes 30-1 and 30-2, the internal arbiter 91 stops each of other nodes 30-3, . . . from transmitting data therefrom and receiving it therein.

A description will now be made of the case where the SLEEP control signal CS indicative of the SLEEP command is supplied from the host CPU or the like. When the SLEEP/WAKE-UP control circuit 61 of the communication control circuit 60 receives a request (SLEEP control signal CS) for proceeding to the SLEEP mode from the host CPU or the like, the SLEEP/WAKE-UP control circuit 61 sets the SLEEP command signal S60*a* to be applied to the differential comparator 40 to the "L". In doing so, the NMOS 54 of the differential comparator 40 shown in FIG. 2 is turned off and the PMOS 53 thereof is turned on so that the VDD is supplied to the gates of the PMOSs 49 and 50, with the result that the PMOSs 49 and 50 are brought into an off state. Thus, the source current is cut off and the current to be used up is reduced.

In order to make the edge detection circuit 70 effective or valid, the SLEEP/WAKE-UP control circuit 61 in the communication control circuit 60 sets the initializing signal S60*b* to be supplied to the edge detection circuit 70 to the "L" to thereby release the edge detection circuit 70 from a reset state and to make the WAKE-UP command signal S73 output from the output terminal 73 of the edge detection circuit 70 effective so as to enter into the SLEEP state.

Thereafter, when the edge detection circuit 70 detects the messages (e.g., a variation in signal level from "1" to "0" in the case of the BUS (−) line 21 and a variation in signal level from "0" to "1" in the case of the BUS (+) line 22) transmitted over the BUS (−) line 21 and the BUS (+) line 22, the WAKE-UP command signal S73 output from the edge detection circuit 70 is brought to "1", so that the communication control circuit 60 detects that it should be woken up. Next, the communication control circuit 60 sets the SLEEP command signal S60*a* supplied to the differential comparator 40 to the "H".

When the SLEEP command signal S60*a* is brought to the "H", the NMOS 54 provided within the differential comparator 40 shown in FIG. 2 is turned on and the PMOS 53 thereof is turned off to activate the PMOS 51, the resistor 55 and the NMOS 54 forming the current source section 63. As a result, the PMOSs 49 and 50, which are in a current-mirror state, are brought into an active state so that the differential comparator 40 starts the reception of an input. Further, the communication control circuit 60 makes the WAKE-UP command signal 73 output from the edge detection circuit 70 ineffective or invalid or initializes the edge detection circuit 70 in accordance with the initializing signal S60*b* so as to enter into the normal operation mode.

Thus, only when the communication control circuit 60 is in the SLEEP state, the communication control circuit 60 activates the edge detection circuit 70 and deactivates the differential comparator 40. On the other hand, when the communication control circuit 60 is in a normal communication state, the communication control circuit 60 deactivates the edge detection circuit 70 and activates the differential comparator 40. Thus, a low power consuming operation is realized.

As described above, advantages of the present embodiment can be summarized as follows:

In the present embodiment, when each of the communication control circuits 60 respectively provided within the nodes 30-1, 30-2, 30-3, . . . is in the SLEEP state, each of them selects the edge detection circuit 70 comprised of the CMOSs and the like providing much less current consumption in a static state. After the WAKE-UP signal has been detected, each of the communication control circuits 60 selects the differential comparator 40 that performs a receiving operation upon the normal operation. Therefore, the current to be used up by the differential comparator 40 being in the SLEEP state can be reduced. Further, since the signal transmission start messages transmitted over the BUS (−) line 21 and the BUS (+) line 22 can be detected by the edge detection circuit 70, each communication control circuit 60 can accurately be shifted to the WAKE-UP.

In a LAN line system operated by a vehicle battery in particular, the current to be consumed during the SLEEP is an important factor. It is thus no exaggeration to say that as the number of the nodes 30-1, 30-2, 30-3, . . . each electrically connected to the BUS (−) line 21 and the BUS (+) line 22 increases, a decision made as to whether or not the LAN line system can be realized depends on the value of the current itself. Thus, a serious problem arises that when a vehicle continues to stop driving, for example, the battery remains discharged and hence the vehicle is not able to start driving. The present embodiment can be used for various purposes. However, if the present embodiment is applied to a LAN provided within the vehicle, which has rapidly been widespread among users, then the present embodiment can bring about a great effect.

Incidentally, the present invention is not necessarily limited to or by the present embodiment and various modification can be made. Examples of the modifications are as follows:

(a) The communication control circuit 60 shown in FIG. 1 proceeds to the SLEEP mode in response to the SLEEP control signal CS supplied from the outside. However, this may depend on other circuit configuration. For example, the communication control circuit 60 may be set to a circuit configuration of such a type that the communication control circuit 60 detects based on the output of the differential comparator 40 that the state of a signal transmitted over each of the BUS (−) line 21 and the BUS (+) line 22 is in a passive state (i.e., in a busΣidle state) and the communication control circuit 60 is automatically shifted to the SLEEP mode when the passive state is continued for a predetermined time interval or more.

(b) Since the circuit for cutting off the current path regardless of the level of each input to thereby reduce the current to be used up when the differential comparator 40 with the SLEEP function is in the SLEEP state may be incorporated into the differential comparator 40, the differential comparator 40 may be comprised of a circuit other than the circuit shown in FIG. 2. Further, the differential comparator 40 may also be constructed of a receiving circuit having other configuration depending on a data transmission system applied onto the BUS (−) line 21 and the BUS (+) line 22.

(c) The edge detection circuit 70 is not necessarily limited to or by the circuit configuration shown in FIG. 3. This circuit configuration may be changed to other circuit configuration of such a type that current consumption is extremely reduced when the edge detection circuit 70 is in the static state.

What is claimed is:

1. A local area network line system having a bus line and a plurality of devices, each of the devices comprising:
   a data receiver circuit having an input coupled to the bus line, an output and a sleep terminal, said data receiver circuit detecting a communication start request from a signal applied on the bus line and being in a sleep mode when said data receiver circuit receives a sleep command signal;
   a transmitting circuit coupled to the bus line for outputting a transmitting signal in response to a transmit control signal;
   an edge detection circuit coupled to the bus line, said edge detection circuit including a schmitt circuit for detecting a level variation of the signal applied on the bus line and a flip flop circuit coupled to the schmitt circuit for outputting a detection signal in response to the detected level variation; and
   a communication control circuit coupled to said data receiver circuit, said transmitting circuit and said edge detection circuit for outputting the transmit control signal to said transmitting circuit, said communication control circuit including a sleep/wake-up control circuit for outputting the sleep command signal to the sleep terminal of said data receiver circuit in response to the detection signal.

2. A local area network line system according to claim 1, wherein said data receiver circuit cuts off its internal current path in response to the sleep command signal.

3. A local area network line system according to claim 1, wherein said communication control circuit further includes a data generator coupled to said transmitting circuit for outputting the transmit control signal to said transmitting circuit, an arbiter coupled to the data generator for controlling a possessory right to the bus line, a decoder coupled to the arbiter for decoding an output of said data receiver, an oscillator for outputting a clock signal and a sample clock generator coupled to the oscillator for sampling digital data on the bus line in response to the clock signal.

4. A local area network line system according to claim 1, wherein said edge detection circuit includes a reset terminal and is initialized when an initializing signal is input to the reset terminal thereof.

5. A local area network line system according to claim 4, wherein said communication control circuit outputs the initializing signal to the reset terminal of said edge detection circuit.

6. A local area network line system having a pair of bus lines and a plurality of devices coupled to the bus lines, each of the devices comprising:
   a differential comparator having a pair of input terminals respectively coupled to the bus lines, an output terminal and a sleep terminal, said differential comparator detecting a communication start request from a signal applied on the bus line and being in a sleep mode when said differential comparator receives a sleep command signal;
   a transmitting circuit coupled to the bus lines for outputting a transmitting signal to the bus lines in response to a transmit control signal;
   an edge detection circuit coupled to the bus line for detecting a level variation of a signal applied on the bus lines and outputting a detection signal in response to the detected level variation; and
   a communication control circuit coupled to the output terminal of said differential comparator, said transmitting circuit and said edge detection circuit for outputting the transmit control signal to said transmitting circuit, said communication control circuit including a sleep/wake-up control circuit for outputting the sleep command signal to the sleep terminal of said differential comparator.

7. A local area network line system according to claim 6, wherein said differential comparator cuts off its internal current path in response to the sleep command signal.

8. A local area network line system according to claim 6, wherein said communication control circuit further includes a data generator coupled to said transmitting circuit for outputting the transmit control signal to said transmitting circuit, an arbiter coupled to the data generator for controlling a possessory right to the bus line, a decoder coupled to the arbiter for decoding an output of said data receiver, an oscillator for outputting a clock signal and a sample clock generator coupled to the oscillator for sampling digital data on the bus line in response to the clock signal.

9. A local area network line system according to claim 6, wherein said edge detection circuit includes a schmitt circuit for detecting the level variation of the signal applied on the bus line and a flip flop circuit coupled to the schmitt circuit for outputting the detection signal in response to the detected level variation.

10. A local area network line system according to claim 9, wherein said edge detection circuit includes a reset terminal and is initialized when an initializing signal is input to the reset terminal thereof.

11. A local area network line system according to claim 10, wherein said edge detection circuit includes:

a schmitt inverter having an input coupled to one of the bus lines and an output;

a first flip flop circuit having a clock terminal coupled to the output of the schmitt inverter, a data terminal coupled to a voltage supply, a Q output and a reset terminal coupled to the reset terminal of said edge detection circuit;

a schmitt buffer having an input coupled to the other bus lines and an output;

a second flip flop circuit having a clock terminal coupled to the output of the schmitt buffer, a data terminal coupled to the voltage supply, a Q output and a reset terminal coupled to the reset terminal of the first flip flop circuit; and a gate circuit having first and second inputs each coupled to the Q outputs of the first and second flip flop circuits and an output.

12. A local area network line system according to claim 10, wherein said communication control circuit outputs the initializing signal to the reset terminal of said edge detection circuit.

13. A local area network line system according to claim 6, wherein said differential comparator comprises:

a differential circuit coupled to the input terminals of said differential comparator for comparing level of the signals appeared on the input terminals and outputting a comparing signal in response to the comparison;

a current source circuit coupled to the sleep terminal of said differential comparator, a power supply and the differential circuit for generating a cut-off signal when the sleep command signal is received thereto; and an output circuit coupled to the output terminal of said differential comparator and the current source circuit, the output circuit enabled in response to the cut-off signal.

14. A local area network line system according to claim 13, wherein the differential circuit comprises:

a first MOS transistor having a gate coupled to one of the input terminals of said differential comparator and first and second terminals;

a second MOS transistor having a gate coupled to the other input terminals of said differential comparator, a first terminal and a second terminal coupled to the second terminal of the first MOS transistor;

a third MOS transistor having a gate, a first terminal coupled to the first terminal of the first MOS transistor and the gate thereof and a second terminal coupled to a first potential source; and a fourth MOS transistor having a gate coupled to the gate of the third MOS transistor, a first terminal coupled to the first terminal of the second MOS transistor and a second terminal coupled to the first potential source.

15. A local area network line system according to claim 13, wherein the current source circuit comprises:

a first MOS transistor having a gate coupled to the sleep terminal of said differential comparator, a first terminal and a second terminal coupled to a second potential source;

a second MOS transistor having a gate, a first terminal coupled to the first terminal of the first MOS transistor and the gate thereof and a second terminal coupled to a second potential source;

a resistive element having a first terminal coupled to the first terminal of the first MOS transistor and a second terminal; and a third MOS transistor having a gate coupled to the sleep terminal of said differential comparator, a first terminal coupled to the second terminal of the resistive element and a second terminal coupled to a first potential source, the current source circuit outputting the cut-off signal from the first terminal of the first MOS transistor.

16. A local area network line system according to claim 15, wherein the current source circuit further comprises a fourth MOS transistor having a gate coupled to the gate of the second MOS transistor, a first terminal and a second terminal coupled to the second potential source.

17. A local area network line system according to claim 13, wherein the output circuit comprises:

a first MOS transistor having a gate coupled for receiving the cut-off signal, a first terminal coupled to the output terminal of said differential comparator and a second terminal coupled to a second potential source; and a second MOS transistor having a gate coupled for receiving the comparing signal, a first terminal coupled to the output terminal of said differential comparator and a second terminal coupled to a first potential source.

18. A local area network system having a bus line and a plurality of devices, each of the devices comprising:

a data receiver circuit having an input coupled to the bus line, an output and a sleep terminal, said data receiver circuit detecting a communication start request from a signal applied on the bus line and being in a sleep mode when said data receiver circuit receives a sleep command signal;

a transmitting circuit coupled to the bus line for outputting a transmitting signal in response to a transmit control signal;

an edge detection circuit coupled to the bus line for detecting a level variation of a signal applied on the bus line and outputting a detection signal in response to the detected level variation; and a communication control circuit coupled to said data receiver circuit, said transmitting circuit and said edge detection circuit for outputting the transmit control signal to said transmitting circuit, said communication control circuit including a sleep/wake-up control circuit for outputting the sleep command signal to the sleep terminal of said data receiver in response to the detection signal, a data generator coupled to said transmitting circuit for outputting the transmit control signal to said transmitting circuit, an arbiter coupled to the data generator for controlling a possessory right to the bus line, a decoder coupled to the arbiter for decoding an output of said data receiver, an oscillator for outputting a clock signal and a sample clock generator coupled to the oscillator for sampling digital data on the bus line in response to the clock signal.

19. A local area network line system according to claim 18, wherein said data receiver circuit cuts off its internal current path in response to the sleep command signal.

20. A local area network line system according to claim 18, wherein said edge detection circuit includes a schmitt circuit for detecting the level variation of the signal applied on the bus line and a flip flop circuit coupled to the schmitt circuit for outputting the detection signal in response to the detected level variation.

21. A local area network line system according to claim 18, wherein said edge detection circuit includes a reset terminal and is initialized when an initializing signal is input to the reset terminal thereof.

22. A local area network line system according to claim 21, wherein said communication control circuit controls the initializing signal to the reset terminal of said edge detection circuit.

23. A local area network line system having a pair of bus lines and a plurality of devices coupled to the bus lines, each of the devices comprising:

a differential comparator having a pair of input terminals respectively coupled to the bus lines, an output terminal and a sleep terminal, said differential comparator detecting a communication start request from a signal applied on the bus line in an active mode and being in a sleep mode when said differential comparator receives a sleep command signal;

a transmitting circuit coupled to the bus lines, said transmitting circuit outputting a transmitting signal to the bus lines in response to a transmit control signal;

an edge detection circuit coupled to the bus lines, said edge detection circuit detecting a level variation of a signal applied on the bus lines and outputting a detection signal in response to the detected level variation, said edge detection circuit being enabled when said differential comparator is in the sleep mode; and a communication control circuit coupled to the output terminal of said differential comparator, said transmitting circuit and said edge detection circuit, said communication control circuit outputting the transmit control signal to said transmitting circuit, and the sleep command signal to the sleep terminal of said differential comparator.

24. A local area network line system according to claim 23, wherein said communication control circuit further includes:

a data generator coupled to said transmitting circuit, the data generator outputting the transmit control signal to said transmitting circuit;

an arbiter coupled to the data generator, the arbiter controlling a possessory right to the bus line;

a decoder coupled to the arbiter, the decoder decoding an output of said data receiver;

an oscillator outputting a clock signal; and a sample clock generator coupled to the oscillator, the sample clock generator sampling digital data on the bus line in response to the clock signal.

25. A local area network line system according to claim 23, wherein said edge detection circuit includes a schmitt circuit detecting the level variation of the signal applied on the bus lines and a flip flop circuit coupled to the schmitt circuit, the flip flop outputting the detection signal in response to the detected level variation.

26. A local area network line system according to claim 23, wherein said differential comparator cuts off its internal current path in response to the sleep command signal.

27. A local area network line system according to claim 23, wherein said edge detection circuit is a static circuit providing less current consumption.

* * * * *